(«12») United States Patent
Barrho et al.

(10) Patent No.: US 7,015,603 B2
(45) Date of Patent: *Mar. 21, 2006

(54) ELECTRIC MOTOR

(75) Inventors: Guenther Barrho, Trossingen (DE);
Peter Wuerfel, Villingen-Schwenningen (DE)

(73) Assignee: Minebea Co., Ltd., Nagano-Ken (JP)

( * ) Notice: Subject to any disclaimer, the term of this patent is extended or adjusted under 35 U.S.C. 154(b) by 105 days.

This patent is subject to a terminal disclaimer.

(21) Appl. No.: 10/713,786

(22) Filed: Nov. 14, 2003

(65) Prior Publication Data

US 2004/0140730 A1 Jul. 22, 2004

(30) Foreign Application Priority Data

Nov. 16, 2002 (EP) .................................. 02025775

(51) Int. Cl.
*H02K 37/14* (2006.01)
*H02K 1/02* (2006.01)
*H02K 1/14* (2006.01)

(52) U.S. Cl. .................................... 310/49 R; 310/257
(58) Field of Classification Search .............. 310/49 R, 310/257, 156.64, 90, 91
See application file for complete search history.

(56) References Cited

U.S. PATENT DOCUMENTS 3,790,834 A 2/1974 Tanaka
5,523,634 A 6/1996 Takahashi et al.
6,700,255 B1 * 3/2004 Stenta ........................ 310/90
6,707,178 B1 * 3/2004 Sakamoto et al. ........ 310/49 R
6,713,936 B1 * 3/2004 Lee ............................ 310/257
6,822,351 B1 * 11/2004 Matsushita et al. ....... 310/49 R
2002/0067087 A1 * 6/2002 Yoshida et al. ........... 310/67 R
2003/0006660 A1 * 1/2003 Kehrer et al. ................ 310/90

OTHER PUBLICATIONS

*Patent Abstracts of Japan*, vol. 014, No. 479, "Small-Sized Generator", Publication No. 02197243, Aug. 3, 1990.
*Patent Abstracts of Japan*, vol. 016, No. 579, "Miniature Motor", Publication No. 04229065, Aug. 18, 1992.

* cited by examiner

*Primary Examiner*—Tran Nguyen
(74) *Attorney, Agent, or Firm*—Lipsitz & McAllister, LLC

(57) ABSTRACT

In order to construct a brushless electric motor comprising a housing, comprising a rotor and comprising a stator, each stator unit including pole shoes, formed as claw poles, as well as a coil positioned following the rotor in the direction of the rotor axis, by means of which the pole shoes can be magnetized, at the lowest possible cost and as simply as possible, it is proposed that the stator unit has two pole shoe elements of which a first pole shoe element has a first pole shoe carrier as well as first pole shoes formed integrally onto this carrier and of which a second pole shoe element has a second pole shoe carrier as well as the second pole shoes formed integrally onto this carrier and that a bearing support made of plastics is molded onto the second pole shoe carrier of the stator unit and is thereby secured to it.

24 Claims, 5 Drawing Sheets

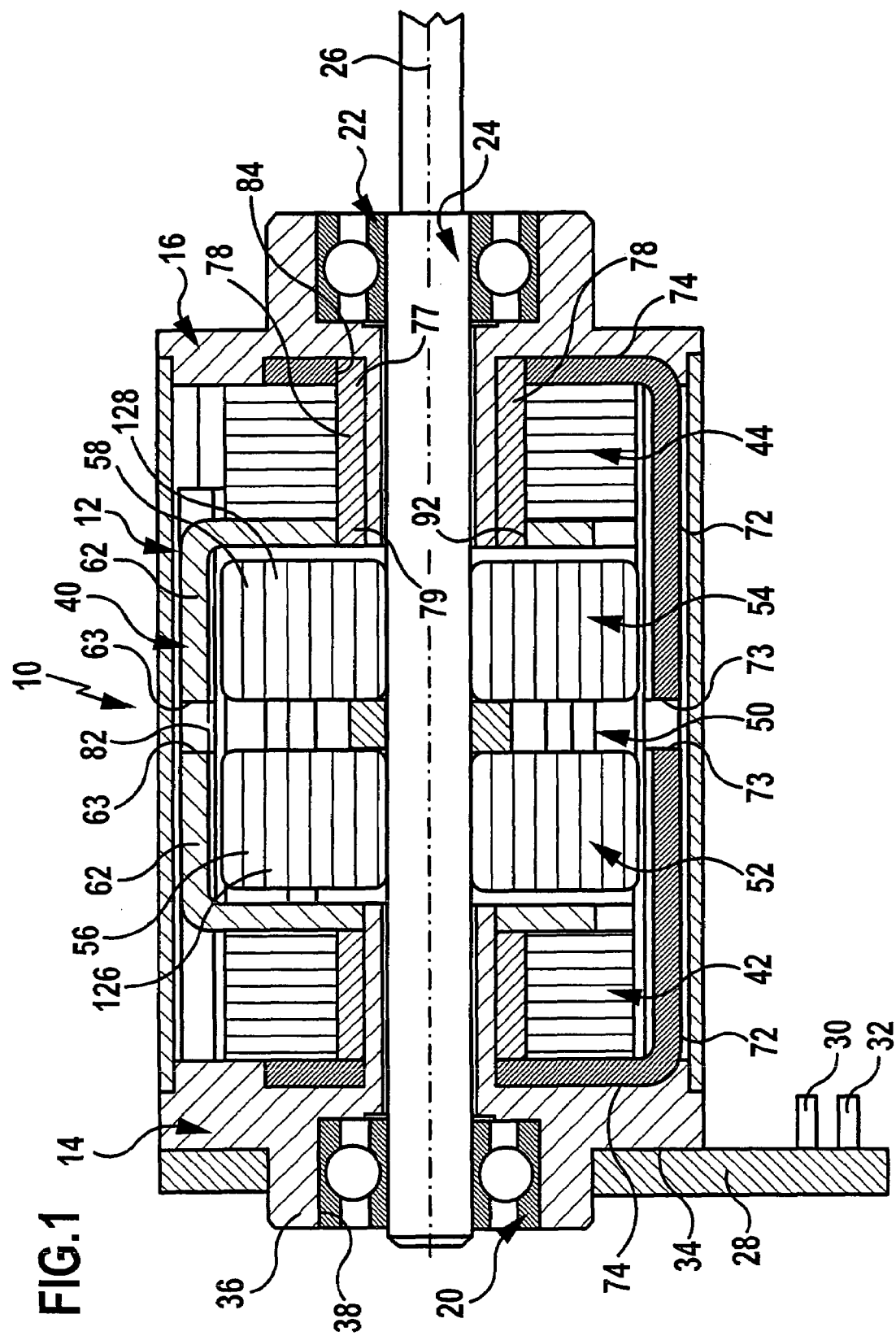

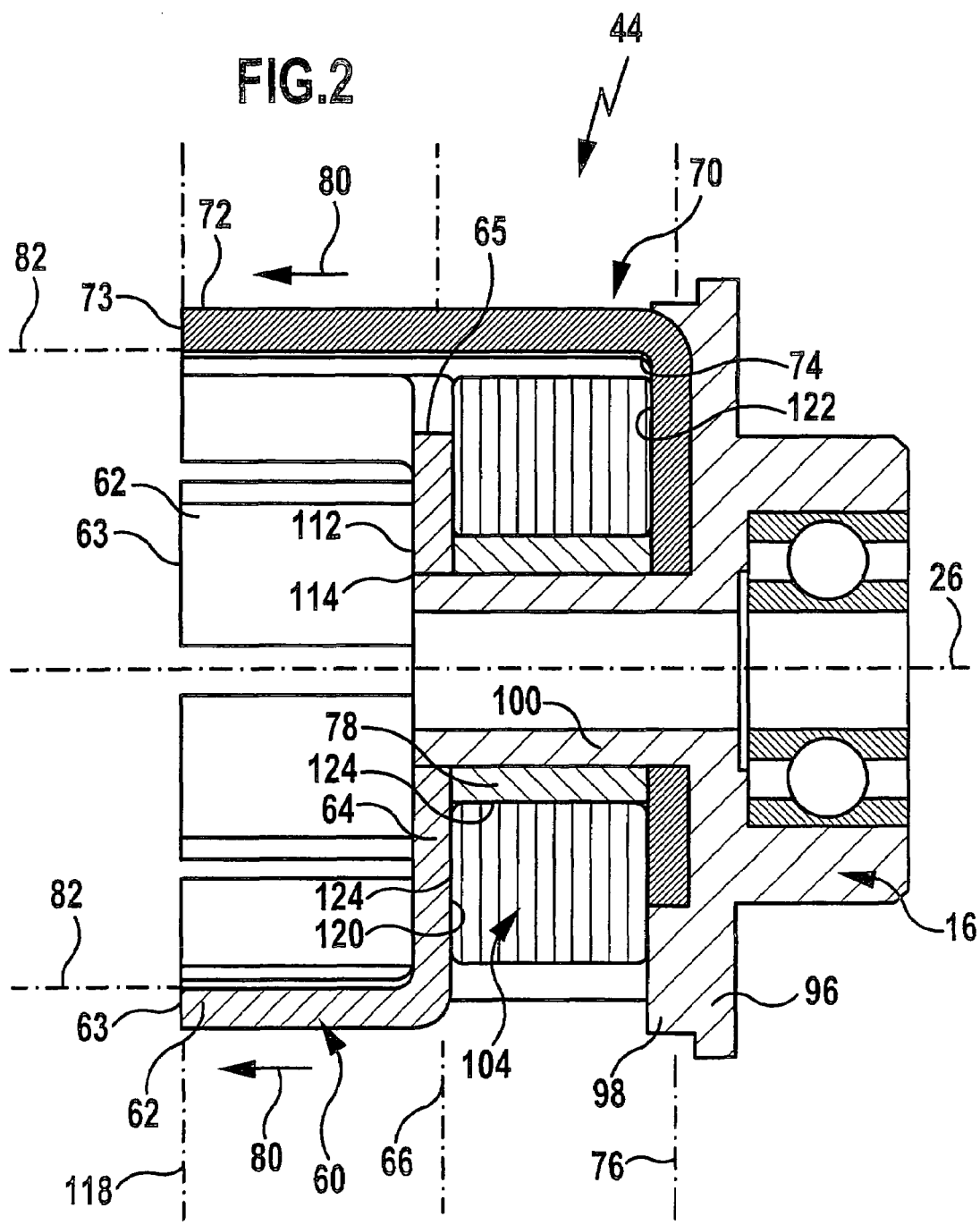

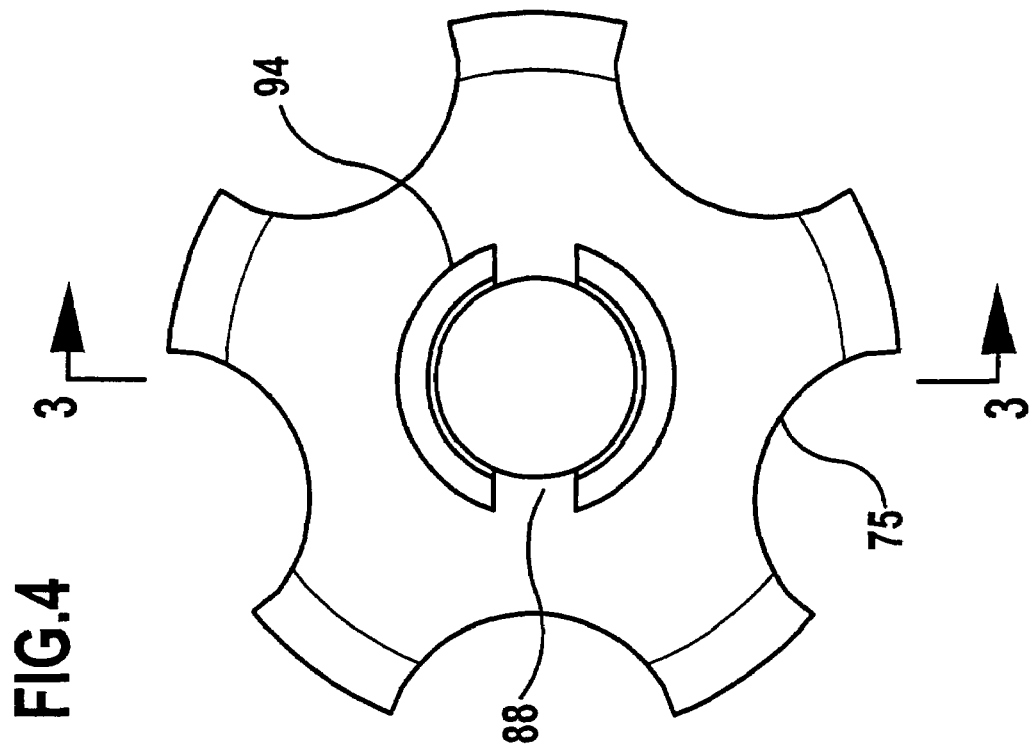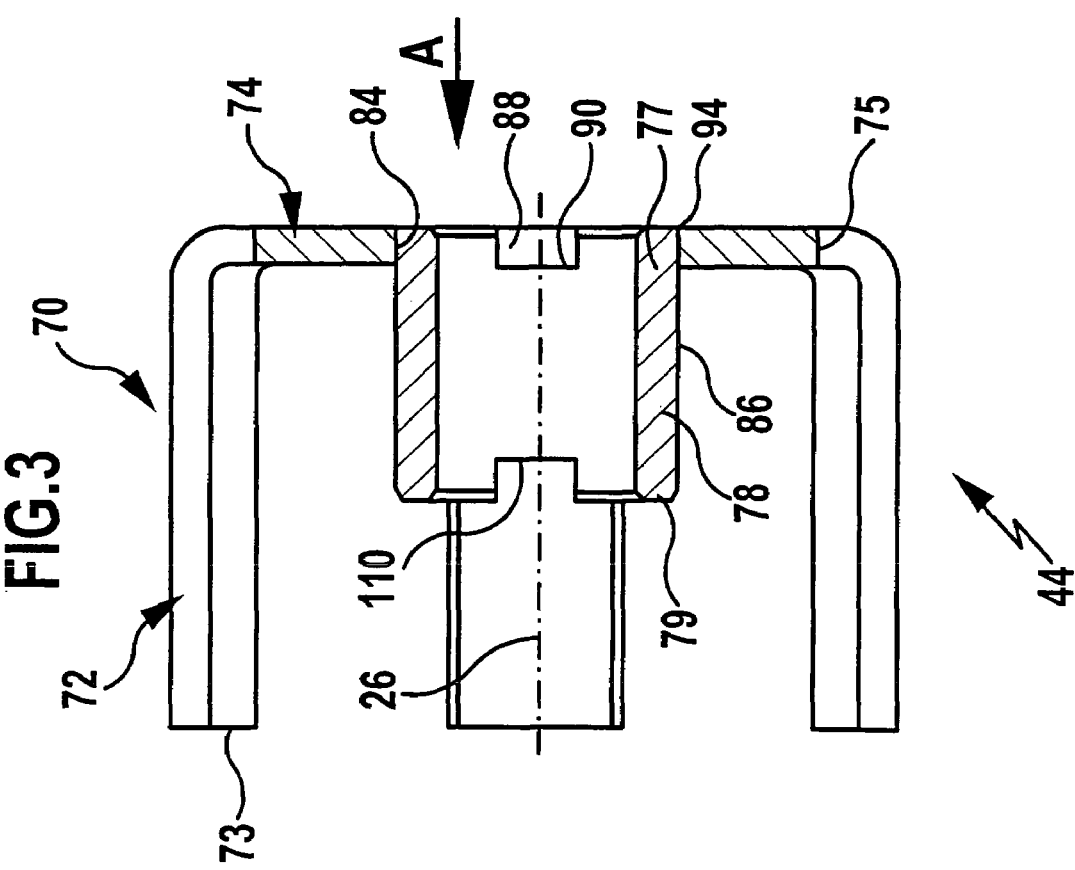

ELECTRIC MOTOR

The present disclosure relates to the subject matter disclosed in European application No. 02 025 775.4 of Nov. 16, 2002, which is incorporated herein by reference in its entirety and for all purposes.

BACKGROUND OF THE INVENTION

The invention relates to a brushless electric motor, in particular a miniature motor, comprising a housing, comprising at least one rotor provided with magnetized regions and mounted rotatably about a rotor axis on bearing supports of the housing, and comprising a stator having at least one stator unit, each stator unit including a set of first pole shoes, formed as claw poles, and a set of second pole shoes, formed as claw poles, which are disposed around the rotor axis, as well as a coil positioned following the rotor in the direction of the rotor axis and with its windings arranged to encircle the rotor axis, by means of which the first and second pole shoes can be magnetized.

Such electric motors are known in the prior art, for which the problem is to construct such motors at the lowest possible cost and as simply as possible.

SUMMARY OF THE INVENTION

This object has been achieved for an electric motor of the type described in the opening paragraph in accordance with the invention in that the stator unit has two pole shoe elements of which a first pole shoe element has a first pole shoe carrier which extends transversely with respect to the rotor axis and is disposed on a side of the coil facing the rotor, as well as the first pole shoes formed integrally onto this carrier, which first pole shoes extend away from the first pole shoe carrier in a first direction approximately parallel to the rotor axis, and of which a second pole shoe element has a second pole shoe carrier which extends transversely with respect to the rotor axis and is disposed on a side of the coil facing away from the rotor, as well as the second pole shoes formed integrally onto this carrier, which second pole shoes also extend in the first direction away from the second pole shoe carrier approximately parallel to the rotor axis beyond the rotor, and that a bearing support made of plastics is molded onto the second pole shoe carrier of the stator unit and is thereby secured to it.

The advantage of the solution according to the invention is to be seen in its enabling a simple and low-cost construction of the stator unit.

A particularly favourable solution provides that a connecting piece which establishes a magnetic circuit between the pole shoe carriers is connected to the second pole shoe carrier to form a unit and that the bearing support is molded onto this unit.

This makes it possible to connect the bearing support fixedly and reliably to both the second pole shoe carrier and to the connecting element.

It is particularly favourable when the connecting element is formed as a sleeve.

A further advantage exists if the bearing support is formed to engage into the connecting element, since this provides a particularly stable and reliable connection between the respective stator unit and the bearing support.

So far, no precise details have been given concerning the molding-on of the bearing support. Basically, all conceivable plastics molding techniques can be used. A particularly suitable method has proved to be that of using injection molding to mold the bearing support onto the second pole shoe carrier.

So far, no precise details have been given concerning the connection of the connecting element to the second pole shoe carrier. For example, if the bearing support is molded onto the connecting element and onto the second pole shoe carrier, the connection between the second pole shoe carrier and the connecting element can also be established via the bearing support.

However, to make it easier to handle the unit consisting of the second pole shoe carrier and the connecting element when molding the respective bearing support on to it, it is preferable if the second connecting element is connected to the second pole shoe carrier by means of joining.

Such joining, for example, could take the form of bonding or soldering. A particularly favourable method in terms of manufacturing is when the connecting element is welded to the second pole shoe carrier.

Joining the material by welding is preferably achieved using a laser, either spot welding or the formation of a closed, continuous weld seam being possible.

The subsequent connection between the connecting element and the first pole shoe carrier can also be effected using various methods. Here it is advantageous if the first pole shoe carrier is directly connected to the connecting element.

Such a connection is preferably achieved by joining the first pole shoe carrier and the connecting element, this joining preferably suitably being effected by welding, particularly by laser welding, in the same way as described in relation to the connection between the connecting element and the second pole shoe carrier.

So far, no precise details have been given concerning the fixing of the coil with respect to the stator units. A particularly favourable solution provides for the connecting element to form a carrier for the coil so that on mounting the stator unit according to the invention onto the connecting element connected to the second pole shoe carrier, the coil can be put on before the first pole shoe carrier is placed onto the connecting element and these are connected together.

To achieve sufficient electrical insulation between the coil and the connecting element as well as the second pole shoe carrier, it is particularly favourable if the connecting element and the second pole shoe carrier on the side facing the coil are provided with an electrically insulating coating.

Moreover, it is even more preferable if the first pole shoe carrier is also provided with an electrically insulating coating on the side facing the coil.

The coating is preferably selected in such a way that it has a thickness of less than 10 $\mu$m, even more preferably less than 5 $\mu$m, so as not to impair the precise alignment of the individual elements of the stator unit relative to each other.

Concerning the type of coating, a large variety of possibilities are conceivable. For example, paint-like or similar coatings are conceivable. A particularly suitable coating provides for a glass-like consistency.

To additionally ensure that the pole shoe elements are protected against corrosion, it is preferable that all the pole shoe elements are provided with a corrosion resistant coating.

This coating need not necessarily be identical to the electrically insulating coating.

A particularly favourable embodiment of the solution according to the invention, however, provides that the electrically insulating coating acts at the same time as a corrosion resistant coating.

Both the first as well as the second pole shoe carriers are preferably coated with this coating.

So far, no precise details have been given concerning the arrangement of the pole shoes with respect to the other elements of the stator unit. It is particularly suitable if the second pole shoes overlap the coil and the coil is thus disposed in the direction of the rotor axis axially offset in relation to the respective rotor unit.

Moreover, it is basically conceivable to arrange the first pole shoes at a different radial distance from the rotor axis than the second pole shoes. To achieve optimum torque for the electric motor, it is preferably provided that the first and second pole shoes lie on the same cylindrical surface about the rotor axis and that the one pole shoes are disposed in the gaps between the other pole shoes.

Moreover, it is preferable if the pole shoes disposed successively in the azimuthal direction around the rotor axis have identical angular spacings from each other.

Moreover, it is particularly favourable within the solution according to the invention if the first and second pole shoes extend so far in the first direction that their ends lie in a common plane running perpendicular to the rotor axis.

In principle, it is possible for an electric motor as according to the invention to have a single stator unit.

However, to be able to clearly define the rotational direction of the rotor, it is preferably provided that the electric motor has a stator with two stator units and a rotor having a rotor unit associated with each stator unit in question, the rotor units being seated on a common shaft.

The pole shoes can then be so arranged that they point in the same direction.

A particularly favourable solution provides that the stator units are arranged in such a way that their pole shoes face each other. This makes it possible for the rotor units to be disposed alongside each other in a particularly expedient way.

To make the best possible use of the available space while achieving the best possible performance, it is preferable if, for both stator units, all pole shoes are disposed on the same cylindrical surface about the rotor axis.

A solution which can be produced at particularly low cost further provides that both stator units are of identical construction so that they can be constructed from identical parts.

Moreover, to clearly establish the rotational direction of the electric motor according to the invention, it is a particular advantage if holding positions of the rotor units determined by the magnetic effect, i.e. attraction, relative to the respective stator units are rotationally displaced in relation to each other by half a pole space.

Further characteristics and advantages of the invention form the subject matter of the description below as well as the illustration in drawings of a number of embodiments.

BRIEF DESCRIPTION OF THE DRAWINGS

FIG. 1 a longitudinal view through an embodiment of the electric motor according to the invention;

FIG. 2 an enlarged section similar to FIG. 1 in the region of a stator unit of the electric motor according to the invention;

FIG. 3 a second pole shoe element with connecting element of the electric motor according to the invention;

FIG. 4 a view from above in the direction of the arrow A in FIG. 3;

DETAILED DESCRIPTION OF THE INVENTION

Figure 5:
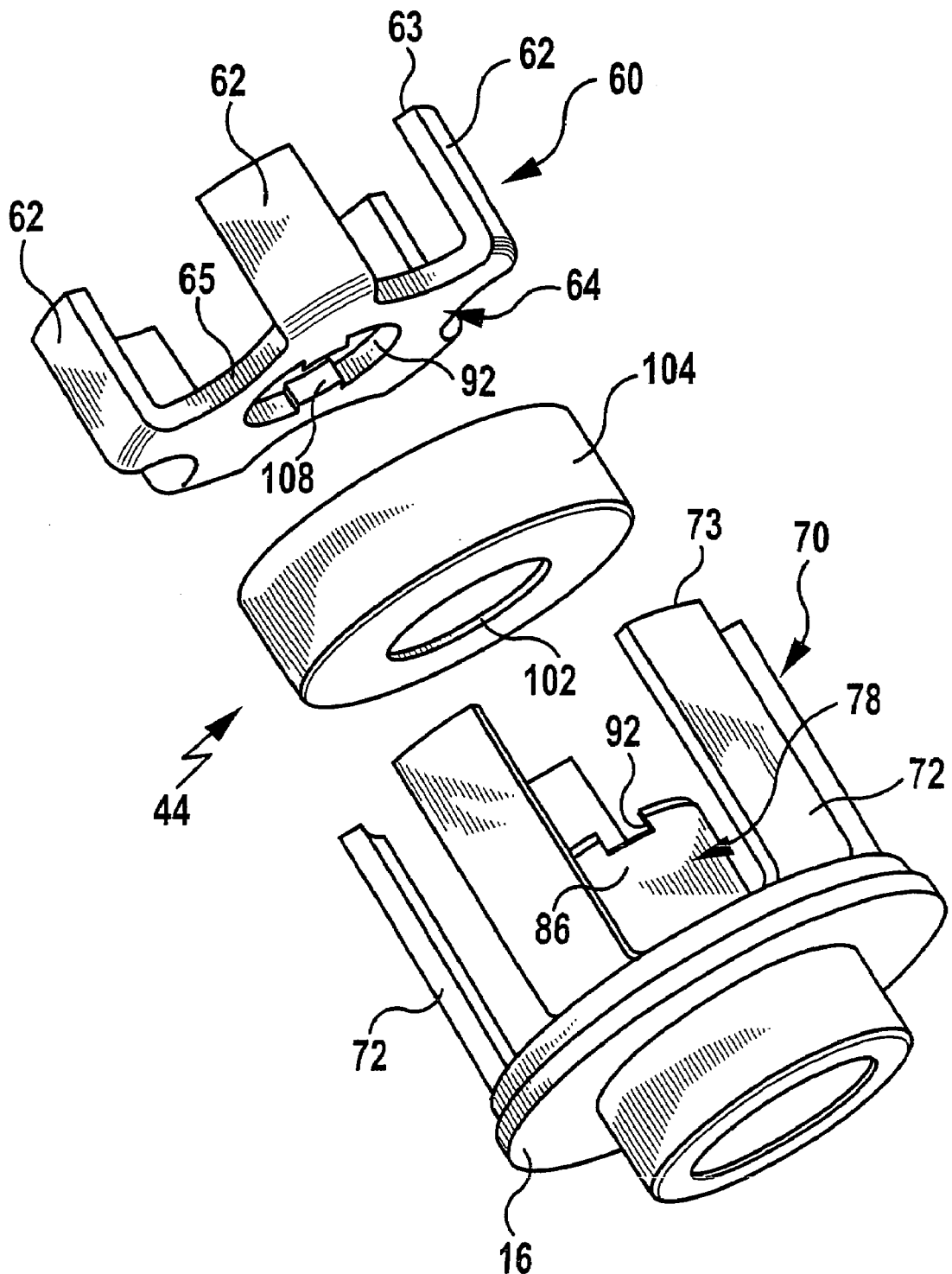
FIG. 5 an exploded view of the stator unit shown in section in FIG. 2.

An embodiment of an electric motor according to the invention as illustrated in FIG. 1, preferably a stepper motor, includes a housing 10 with a housing sleeve 12 which extends between a first bearing support 14 and a second bearing support 16, both of which are fixedly connected to the housing sleeve 12.

In each of the bearing supports 14 and 16, a respective rotary bearing 20 and 22 is mounted, both preferably formed as ball bearings, by means of which a shaft 24 is mounted about an axis 26 to be rotatable with respect to the housing 10.

Moreover, the first bearing support 14 carries a connection board 28, on which electric terminals 30, 32 are disposed for connection of a power supply of the electric motor.

The connection board 28 is preferably then located on an outer surface 34 of the bearing support 14 and encloses a retaining ring 36 of the bearing support 14, which in turn forms a receptacle 38 for the rotary bearing 20.

Both a stator 40, formed by two identically constructed stator units 42 and 44 arranged in mirror image to each other, as well as a rotor 50, formed by two rotor units 52 and 54, are disposed in the housing 10, the rotor 50 with both of its rotor units 52 and 54 being seated fixedly on the shaft 24 and thus, in the same way as the shaft 24, being mounted about the axis 26, representing the rotor axis, by means of the rotary bearings 20 and 22, to be rotatable with respect to the housing 10. In addition, each of the rotor units 52, 54 has magnetized regions 56 and 58.

As shown in an enlarged view in FIGS. 2 and 3, the stator unit 44 includes a first pole shoe element 60, which includes a first set of pole shoes 62 formed as claw poles which extend approximately parallel to the axis 26.

Here, the first set of pole shoes 62 is formed integrally on a first pole shoe carrier 64 which preferably extends in a plane 66 running perpendicular to the axis 26.

The first pole shoe element 60 is suitably a punched bent part and can thus be manufactured at low cost.

A second pole shoe element 70 includes a set of second pole shoes 72 which, in the same way as the first pole shoes 62, extend approximately parallel to the axis 26 and are then formed integrally on a second pole shoe carrier 74 which preferably extends in a plane 76 perpendicular to the axis 26.

The first and second pole shoes 62, 72 are preferably located on an enveloping surface 82 running circular-cylindrically to the axis 26.

The second pole shoe element 70 is also suitably a punched bent part.

A magnetic circuit between the first pole shoe carrier 64 and the second pole shoe carrier 74 is produced by a connecting element depicted as a whole by 78 which, as shown in FIGS. 3 and 4, is initially connected to the second pole shoe element 74 in the region of a first end 77 and by the second pole shoe carrier 74 having a central recess 84 into which the first end 77 of the connecting element 78 engages, an outer surface 86 of the connecting element fitting snugly in the recess 84.

Precise alignment of the connecting element 78 in relation to the second pole shoe carrier 74 is preferably effected by means of projections 88 provided on the second pole shoe carrier 74 which engage in cutouts 90 of the connecting element 78, the projections 88 extending out beyond the contour of the recess 84 in the direction of the rotor axis 26 in order to engage into the cutouts 90.

Moreover, connection of the first pole shoe carriers 64 to the connecting element 78 in the region of a second end 79 is effected by the second end 79 of the connecting element 78 engaging into a central recess 92 of the first pole shoe carrier 64.

The invention provides that first of all the second pole shoe element 70 is manufactured as a punched bent part and after the connecting element 78 has been inserted into the recess 84, welding then takes place by production of a weld seam 94 which preferably runs on a side of the second pole shoe carrier 74 facing away from the first pole shoe carrier 64 and which produces a connection between the recess 84 of the second pole shoe carrier 74 and the outer surface 86 of the connecting element 78.

The unit illustrated in FIG. 3, 4 consisting of the second pole shoe element 70 and the connecting element 78 is then connected to the bearing support 16 using plastics injection molding by molding-on of the bearing support 16, as shown in FIG. 2, the bearing support 16 having a supporting plate 96 on one side, noses 98 of which engage into cutouts 75 in the second pole shoe carrier 74 which are provided radially between the pole shoes 72 and run radially inwards in relation to the rotor axis 26, in order to receive the second pole shoe carrier 74 centered with respect to the axis 26, so that when the bearing support 16 is molded-on using plastics injection moulding, the second pole shoe carrier 74 is at least partly embedded in the supporting plate 96.

In addition, when the bearing support 16 is molded onto the supporting plate 96, a sleeve-shaped receiving portion 100 is formed, the receiving portion 100 extending into the connecting element 78 formed as a sleeve, thus resulting in the unit consisting of the second pole shoe element 70 and the connecting element 78 being better secured to the bearing support 16.

After the bearing support 16 has been injection molded onto the unit consisting of the second pole shoe element 70 and the connecting element 78, a coil 104, pre-wound onto a coil former 102, is mounted, as shown in FIG. 4, so that the coil former 102 engages against the connecting element 78, in particular the outer surface 86 of the same. Finally, the first pole shoe element 60 together with the first pole shoe carrier 64 is mounted, projections 108 on the first pole shoe carrier 64 engaging into the cutouts 110 for fixedly securing the first pole shoe carrier 64, to the connecting element 78, while the outer surface 86 of the connecting element 78 engages into a cutout 92 in the first pole shoe carrier 64, thus making it possible to position the first pole shoe carrier 64 accurately in a positive-fit with respect to the connecting element 78 (FIG. 3, 5).

Welding then preferably takes place between the connecting element 78 and the first pole shoe carrier 64, preferably on a side 112 of the first pole shoe carrier 64 facing away from the second pole shoe carrier 74, by application of a weld seam 114 to bridge a gap between the connecting element 78 and the first pole shoe carrier 64 in the region of the cutout 92 and the outer surface 86.

In this way, the coil 104 is mounted fixedly between the pole shoe carriers 64 and 74, the second pole shoes 72 projecting beyond the coil 104.

Moreover, the second pole shoes 72 extend in the first direction 80 to the end 73 and in addition the first pole shoes 62 also extend to their end 63, the ends 73 and 63 of the pole shoes 72 and 62 lying in a plane 118 which runs perpendicular to the axis 26.

To achieve a sufficiently large spacing between the first pole shoe carrier 64 and the second pole shoes 72, the first pole shoe carrier 64, as illustrated particularly in FIG. 4, is provided with recesses 65 between the pole shoes 62, cut radially inwards in the direction of the axis 26 so that the first pole shoe carrier 64 has a sufficiently great spacing from the second pole shoes 72.

Figure 6:
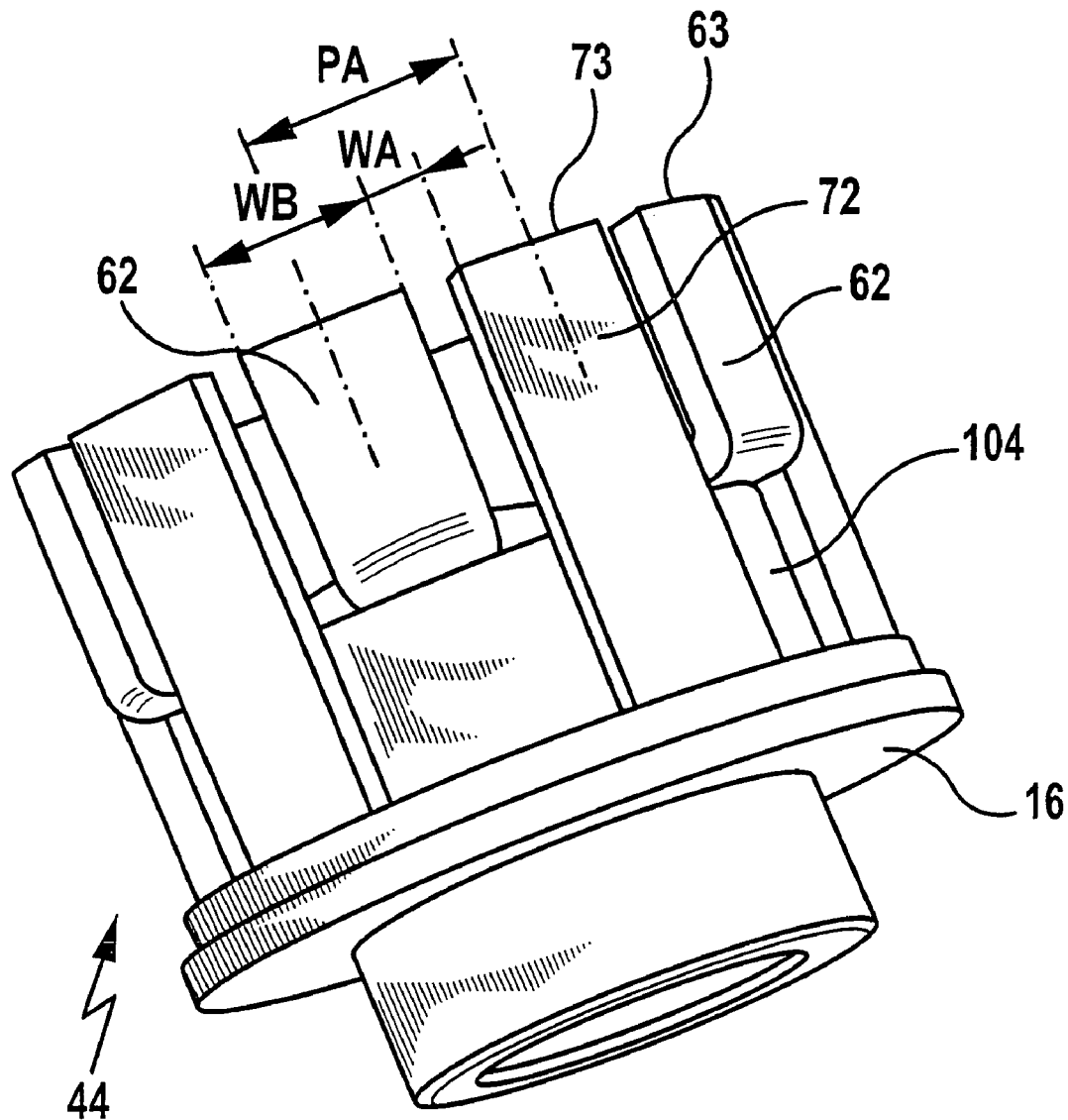
FIG. 6 a perspective assembled view of the stator unit illustrated in FIG. 2.

As illustrated in FIG. 6, all the pole shoes 62, 72 have a width in an azimuthal direction with respect to the axis 26 which represents an angular spacing WB, and respective pole shoes 62, 72 which follow one another at a pole spacing of PA are disposed at an angular spacing of WA from each other in relation to the axis 26, which is identical between all pole shoes 62, 72.

To electrically insulate the coil 104 in relation to the pole shoe elements 60, 70, at least the connecting element 78 in the region of the outer surface 86 as well as the first pole shoe carrier 64 on the side 120 thereof facing the coil 104 and the second pole shoe carrier 74 on the side 122 thereof facing the coil 104 are provided with a coating 124 which has a layer thickness of less than 10 μm, still better less than 5 μm, and is electrically insulating, with a dielectric strength of up to 0.5 kV.

The coating 124 is preferably a glass-like layer, in particular a CVD layer, and is preferably also used to protect the pole shoe elements 60, 70 against corrosion, so that the entire pole shoe elements 60, 70 as well as the connecting element 78 are covered with this coating 124.

In the embodiment of an electric motor according to the invention, the stator units 42, 44, are formed identical to each other, as can be seen in FIG. 1, with each bearing carrier 14, 16 being molded onto at least the second pole shoe carrier 74, so that the pole shoes 62, 72 of both stator units suitably lie on the same cylindrical enveloping surface 82 about the axis 26 and are also disposed with their ends 63, 73 facing each other. This allows the respective rotor unit 52, 54 to be located in each space 126, 128 enclosed by the pole shoes 62, 72.

For example, the two rotor units 52, 54 can be disposed separately on the motor shaft 24 and connected fixedly to the shaft so that, for example, it is possible to arrange the rotor units 52, 54 on the shaft 24 with a rotational offset in relation to each other, preferably rotationally offset in relation to each other by approximately half a pole distance PA, while the pole shoes 62, 72 are located exactly opposite each other.

What is claimed is:

1. An electric motor comprising:
   a housing,
   at least one rotor provided with magnetized regions and mounted rotatably about a rotor axis on bearing supports of the housing,
   a stator having at least one stator unit, each of said at least one stator unit including a set of first pole shoes, formed as claw poles, and a set of second pole shoes, formed as claw poles, said first and second sets of pole shoes being disposed around the rotor axis,
   a coil positioned following the rotor in the direction of the rotor axis and with coil windings arranged to encircle the rotor axis, for magnetizing the first and second pole shoes,
   each of said at least one stator units having two pole shoe elements:
   a first pole shoe element having a first pole shoe carrier which extends transversely with respect to the rotor axis and is disposed on a side of the coil facing the rotor, the first pole shoes formed integrally onto the first pole shoe carrier such that the first pole shoes extend away from the first pole shoe carrier in a first direction approximately parallel to the rotor axis, and a second pole shoe element having a second pole shoe carrier which extends transversely with respect to the rotor axis and is disposed on a side of the coil facing away from the rotor, the second pole shoes formed integrally onto the second pole shoe carrier such that the second pole shoes also extend in the first direction away from the second pole shoe carrier approximately parallel to the rotor axis beyond the rotor, and a bearing support made of plastics being molded onto the second pole shoe carrier of the stator unit and is thereby secured to the second pole shoe carrier.

2. An electric motor according to claim 1, wherein a connecting element which establishes a magnetic circuit between the pole shoe carriers is connected to the second pole shoe carrier to form a unit and the bearing support is molded onto this unit.

3. An electric motor according to claim 2, wherein the connecting element is formed as a sleeve.

4. An electric motor according to claim 2, wherein the bearing support is formed to engage into the connecting element.

5. An electric motor according to claim 1, wherein the bearing support is formed by means of injection molding.

6. An electric motor according to claim 2, wherein the connecting element is joined to the second pole shoe carrier.

7. An electric motor according to claim 6, wherein the connecting element is welded to the second pole shoe carrier.

8. An electric motor according to claim 2, wherein the first pole shoe carrier is connected to the connecting element.

9. An electric motor according to claim 8, wherein the first pole shoe carrier is joined to the connecting element.

10. An electric motor according to claim 2, wherein the connecting element forms a carrier for the coil.

11. An electric motor according to claim 2, wherein the connecting element and the second pole shoe carrier are provided with an electrically insulating coating on the side facing the coil.

12. An electric motor according to claim 11, wherein the first pole shoe carrier is provided with an electrically insulating coating on the side facing the coil.

13. An electric motor according to claim 11, wherein the coating has a thickness of less than 10 μm.

14. An electric motor according to claim 11, wherein the coating has a glass-like consistency.

15. An electric motor according to claim 1, wherein the pole shoe elements are provided with a corrosion-resistant coating.

16. An electric motor according to claim 1, wherein the second pole shoes overlap the coil.

17. An electric motor according to claim 1, wherein:

the first and second pole shoes lie on the same cylindrical surface which extends about the rotor axis; and the first pole shoes are disposed in the gaps between the second pole shoes.

18. An electric motor according to claim 17, wherein the pole shoes are disposed successively in an azimuthal direction around the rotor axis and have identical angular spacings from each other.

19. An electric motor according to claim 17, wherein the first and second pole shoes extend in the first direction such that their ends lie in a common plane running perpendicular to the rotor axis.

20. An electric motor according to claim 1, wherein the electric motor has a stator with two stator units and a rotor having a respective rotor unit associated with each stator unit, the rotor units being seated on a common shaft.

21. An electric motor according to claim 20, wherein the stator units are arranged in such a way that their pole shoes face each other.

22. An electric motor according to claim 20, wherein for both stator units, all pole shoes are disposed on the same cylindrical surface around the rotor axis.

23. An electric motor according to claim 20, wherein both of the stator units are of identical construction.

24. An electric motor according to claim 20, wherein holding positions of the rotor units, determined by magnetic effect, relative to the respective stator units, are rotationally displaced in relation to each other by half a pole space.

* * * * *